(12) United States Patent
Monsalve et al.

(10) Patent No.: US 7,066,358 B2
(45) Date of Patent: Jun. 27, 2006

(54) WATERING CONTAINER

(75) Inventors: Luis Arsenio García Monsalve, Brooklyn, NY (US); Agnete Enga, Brooklyn, NY (US); Antonio Carlo Hernandez Celestin, Brooklyn, NY (US); Anthony Di Bitonto, Brooklyn, NY (US); Adriana Bárcena Kliegman, New York, NY (US)

(73) Assignee: Helen of Troy Limited, Bridgetown (BB)

( * ) Notice: Subject to any disclaimer, the term of this patent is extended or adjusted under 35 U.S.C. 154(b) by 0 days.

(21) Appl. No.: 10/866,462

(22) Filed: Jun. 11, 2004

(65) Prior Publication Data

US 2005/0274742 A1    Dec. 15, 2005

(51) Int. Cl.
  *B67D 5/38* (2006.01)
  *B67D 3/00* (2006.01)

(52) U.S. Cl. .................. 222/158; 222/465.1; 222/533; 222/536; 222/538; 222/565; 239/377

(58) Field of Classification Search ................ 222/157, 222/158, 465.1, 533, 534, 536, 538, 565; 239/377, 378
See application file for complete search history.

(56) References Cited

U.S. PATENT DOCUMENTS

| 283,287 | A | | 8/1883 | Schoening | |
|---|---|---|---|---|---|
| 519,534 | A | * | 5/1894 | James | 222/534 |
| 880,522 | A | | 3/1908 | Gray | |
| 1,078,005 | A | | 11/1913 | Skanks | |
| 1,555,176 | A | * | 9/1925 | Allen | 222/154 |
| 2,526,040 | A | * | 10/1950 | O'Brien | 222/474 |
| 4,125,207 | A | * | 11/1978 | Ernst et al. | 222/130 |
| 4,236,655 | A | | 12/1980 | Humphries | |
| D266,450 | S | | 10/1982 | Swett et al. | |
| 4,650,100 | A | | 3/1987 | Echazabal, Jr. | |
| D295,547 | S | | 5/1988 | Cunning | |
| 4,811,870 | A | * | 3/1989 | Bianco | 222/461 |
| D320,430 | S | | 10/1991 | Renfrew | |
| D320,431 | S | | 10/1991 | Mattei | |
| 5,277,343 | A | * | 1/1994 | Parsonage | 222/484 |
| D357,729 | S | | 4/1995 | Boyd | |
| 5,447,245 | A | * | 9/1995 | Merhar | 215/6 |
| D375,139 | S | | 10/1996 | Thorp | |
| D390,410 | S | | 2/1998 | Berge et al. | |
| D401,668 | S | | 11/1998 | Kreizel | |
| 5,915,628 | A | | 6/1999 | Kreizel | |
| D416,978 | S | | 11/1999 | Haley et al. | |
| D425,602 | S | | 5/2000 | Koziol | |
| D447,788 | S | | 9/2001 | Rosenberg | |
| 6,302,336 | B1 | | 10/2001 | Brown et al. | |
| 6,427,879 | B1 | * | 8/2002 | Caldwell | 222/465.1 |
| D468,799 | S | | 1/2003 | Kortleven | |

\* cited by examiner

*Primary Examiner*—Joseph A. Kaufman
(74) *Attorney, Agent, or Firm*—Seyfarth Shaw LLP (57) ABSTRACT

A fluid container includes a body defining a storage compartment, an elongated spout carried by the body and in fluid communication with the storage compartment, and a swivel coupling between the spout on the body accommodating swiveling of the spout relative to the body about an axis extending upwardly from the bottom of the body. The spout may swivel between a pouring position extending away from the body and a storage position disposed closely adjacent to the body. The spout may be of light transmitting material and volume indicia may be formed on the body adjacent to the spout.

13 Claims, 7 Drawing Sheets

WATERING CONTAINER

BACKGROUND

This application relates to fluid containers and, in particular, to containers provided with spouts to facilitate pouring therefrom, such as watering cans and the like.

Various types of watering cans are known, typically being provided with elongated, laterally extending spouts. These spouts result in an overall awkward shape for the container which may make storage difficult. It is known to provide liquid containers with flexible spouts which can be bent or deflected into storage positions more closely adjacent to the container, when not in use, to facilitate storage. However, the repeated flexing of such flexible spouts can weaken them and ultimately result in failure or the opening of cracks which can leak.

Containers, such as watering cans, are typically provided with a handle extending laterally from the side or upwardly from the top of the container. This positioning makes it difficult and awkward to pour from the container in an overhead position. Also, such handles are typically uncomfortable to use, particularly with large-volume containers which, when full, may be quite heavy.

Frequently, it is desirable to know the volume of fluid in a container, such as a watering can. For example, it may be desired to mix a fertilizer liquid or powder with a predetermined volume of water. In typical watering cans it is difficult or impossible to accurately determine the volume of fluid in the container unless it has been pre-measured before being placed in the container.

SUMMARY

There is disclosed herein an improved fluid container which avoids the disadvantages of prior containers while affording additional structural and operating advantages.

In an embodiment, there is provided a fluid container which includes a body having a bottom and a top and defining a storage compartment therein, an elongated spout carried by the body in fluid communication with the storage compartment for pouring a fluid therefrom, and a swivel coupling between the spout and the body accommodating swiveling of the spout relative to the body about an axis extending upwardly from the bottom of the body.

In an embodiment, the spout may be formed of a light-transmitting material so that the level of fluid in the spout is visible to a user, and volume indicia may be provided on the body adjacent to the spout so that the level of liquid in the spout can easily be correlated with the indicia for indicating the volume of fluid in the storage compartment.

Also in an embodiment, the body may have a predetermined external contour, the swivel coupling accommodating swiveling of the spout about the axis between a pouring position extending away from the body and a storage position, such that in the storage position the spout is disposed closely adjacent to the body and follows the predetermined contour of the body from the bottom to the top thereof.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

Referring to FIGS. 1–5, there is illustrated a fluid container in the form of a watering can 10 having a body 11 with a bottom or base 12 and a top 13 and defining a storage compartment 15 therein. In the illustrated embodiment, the body 11 has a generally oblong shape with a front-two-back depth greater than its side-to-side width, although it will be appreciated that the body could have any desired shape which generally defines an open-top vessel. The body 11 has an enlarged fill opening 16 at the top thereof, which is provided with a generally semi-circular cutout 17 at the rear end thereof (see FIG. 5). The body 11 has a generally tubular shaped upper projection 18 projecting upwardly and rearwardly from the top thereof forwardly of the fill opening 16, and a generally tubular projection 19 extending rearwardly therefrom adjacent to the base 12.

Figure 7:
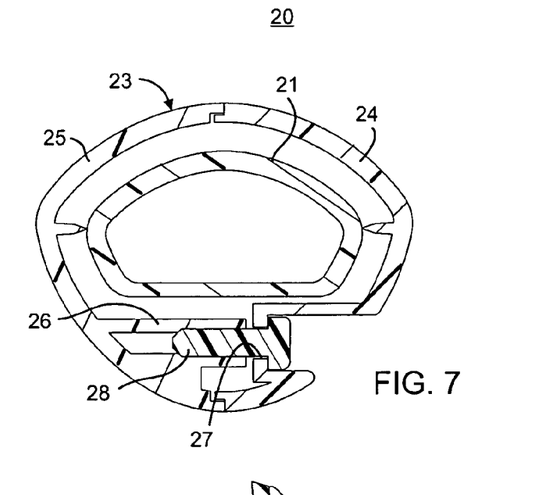
FIG. 7 is an enlarged sectional view taken generally along the line 7—7 in FIG. 1.

Extending between the projections 18 and 19 is a handle assembly 20, which includes an elongated, inner handle tube 21 (FIGS. 4 and 5) which has a generally vertically extending rear portion spaced rearwardly from the body 11 and a forwardly projecting upper portion spaced above the top of the body 11. The inner handle tube 21 communicates with the projections 18 and 19 and is formed integrally therewith, and may be formed unitary therewith. Generally semi-cylindrical indents or notches 22 are formed at longitudinally spaced-apart locations along the outer and inner sides of the handle tube 21 extending laterally thereof. The handle assembly 20 includes a grip assembly 23 including left-hand and right-hand shells 24 and 25 which, respectively, cover the left and right sides of the inner handle tube 21 and snap together for cooperation to completely enclose the handle tube 21. One of the shells 24 and 25 is provided with a plurality of internally threaded bosses 26 (see FIG. 7) while the other is provided with openings 27 for respectively receiving screws 28 to securely fasten the shells 24 and 25 together. Each of the shells 24 and 25 is provided along its inner surface with an overmolded friction pad 29, which may be formed of a suitable elastomeric material, such as that formed under the trade name SANTOPREN. As can best be seen in FIG. 4, the handle assembly 20 provides a continuous channel which communicates with the storage compartment 15 through the projections 18 and 19.

Projecting forwardly from the base 12 of the body 11 is a front extension 30, the outer lower surface of which defines a grip surface 31 to facilitate grasping the body 11 to assist in lifting it overhead, for a purpose to be explained more fully below. The front extension 30 has a sloping upper surface, from which projects a generally cylindrical neck 32 provided with circumferential grooves 33 and 34 in the outer surface thereof adjacent to the upper and lower ends thereof, the upper groove 33 having an O-ring seal 35 seated therein. A detent bead 36 projects forwardly from the upper rear end of the front extension 30 (see FIG. 5) for a purpose to be explained below. The neck 32 has a longitudinal central axis 37 which is disposed substantially perpendicular to the upper surface of the front extension 30, and is inclined upwardly and forwardly relative to the base 12.

The front of the body 11 defines an arcuate contour 38 extending from the front extension 30 to the upper projection 18. Vertically spaced-apart volume indicia 39 may be disposed along the outer surface of the body 11 along the front contour 38.

Figure 5:
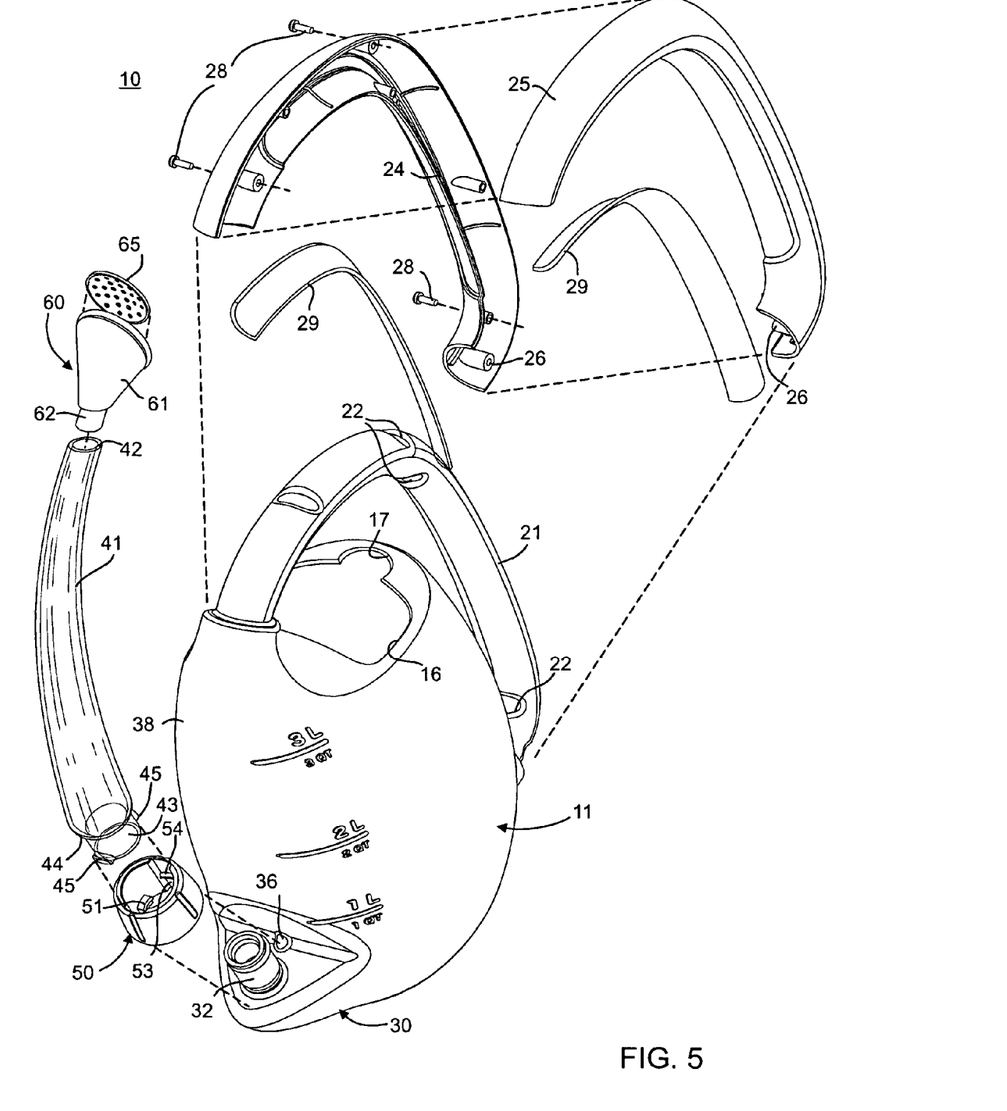
FIG. 5 is a reduced exploded perspective view of the watering can of FIG. 1.

The watering can 10 is provided with a spout assembly 40 including an elongated, arcuate spout 41 having a relatively narrow discharge end, the spout 41 widening downwardly and terminating in a reduced-diameter entry end 43 which defines an annular shoulder 44 (see FIG. 5). Projecting outwardly from the reduced-diameter end 43 at diametrically opposed locations are lugs 45.

Figure 8:
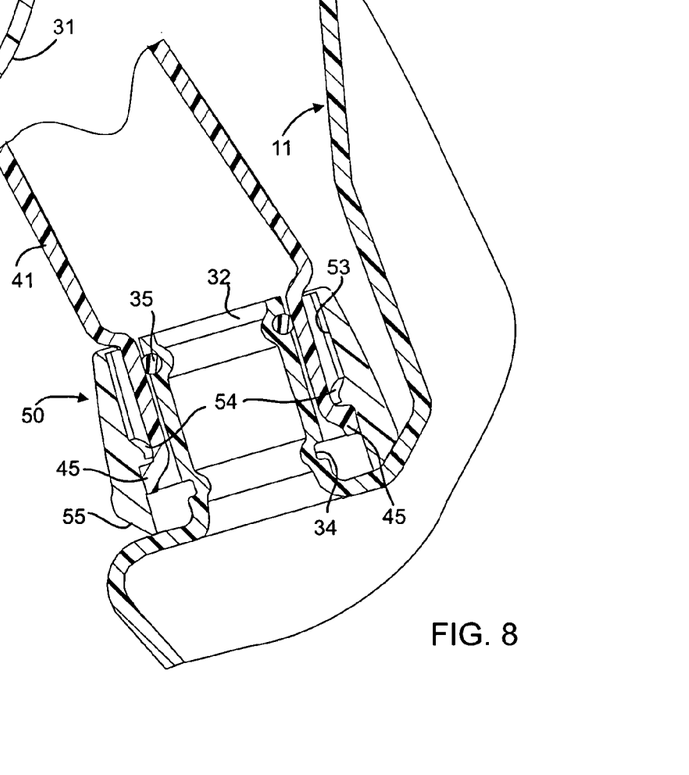
FIG. 8 is an enlarged, fragmentary view of the encircled portion labeled "8" in FIG. 4.
Figure 10:
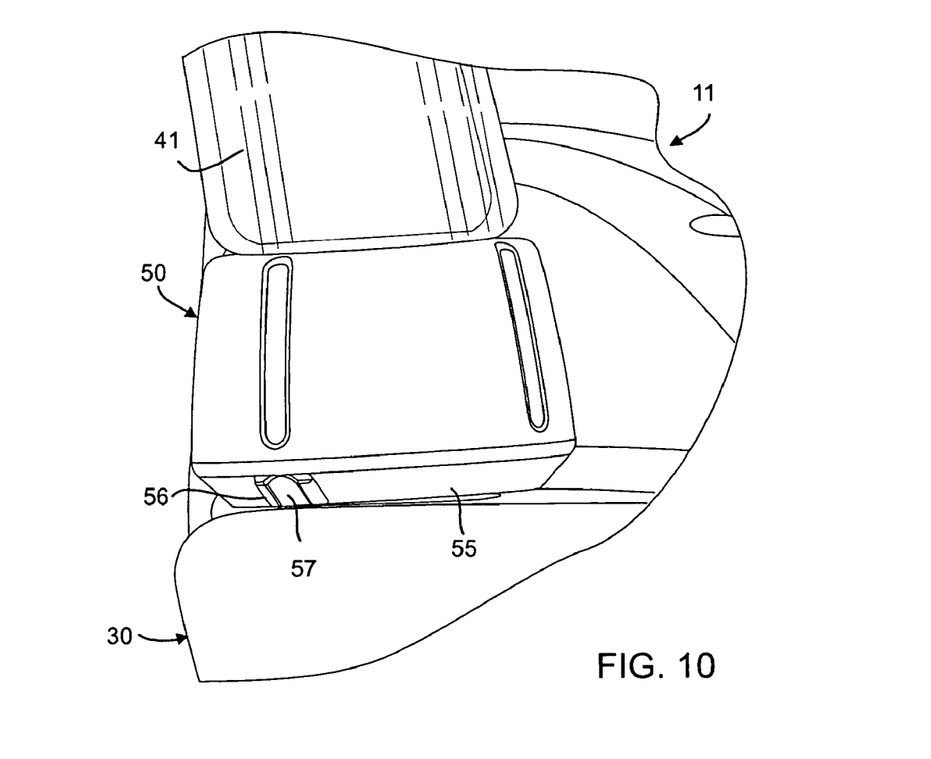
FIG. 10 is an enlarged, fragmentary perspective view of a portion of the spout swivel coupling of the watering can of FIG. 1.

The spout assembly 40 includes a generally annular collar 50, provided along its inner surface with radially inwardly projecting lugs 61 at diametrically opposed locations (see FIGS. 5 and 8). Formed in the inner surface of the collar 50 at diametrically opposed locations spaced 90° from the lugs 51 are axially extending channels or grooves 53, each provided intermediate its ends with a radial inward projecting shelf or shoulder 54. The collar 50 has a downwardly and radially inwardly sloping short frustoconical surface 55 at its lower end, on which are formed two detent pads 56 at diametrically opposed locations substantially aligned with the grooves 53, each pad having a detent groove 57 formed therein (see FIG. 10).

Figure 6:
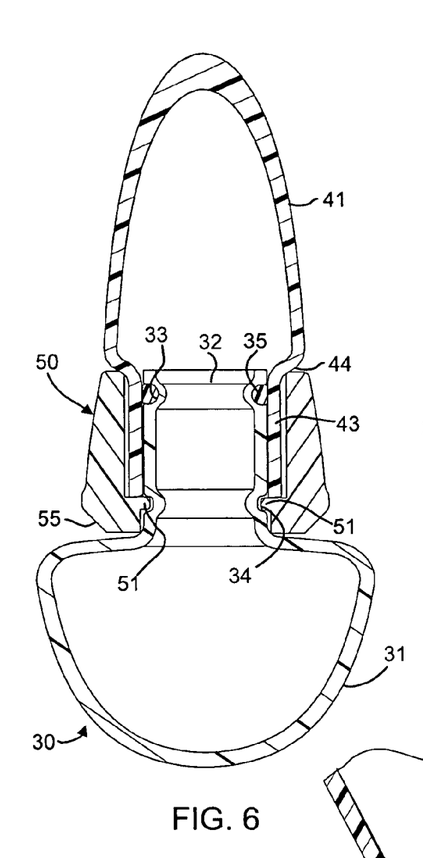
FIG. 6 is an enlarged sectional view taken generally along the line 6—6 in FIG. 1.

In assembly, the collar 50, with its frustoconical surface 55 facing downwardly, is fitted over the narrow discharge end 42 of the spout 41 and pushed down onto the reduced diameter entry end 43, the spout lugs 45 riding in the lower ends of the grooves 53 until they engage the undersides of the collar shoulders 54 (see FIG. 8), the parts being sufficiently flexible to accommodate this movement. Then the spout/collar assembly is mounted on the neck 32 until the collar lugs 51 snap into the lower neck groove 34 (see FIG. 6), the cap O-ring 35 being disposed in sealing engagement with the inner surface of the spout entry end 43.

Figure 4:
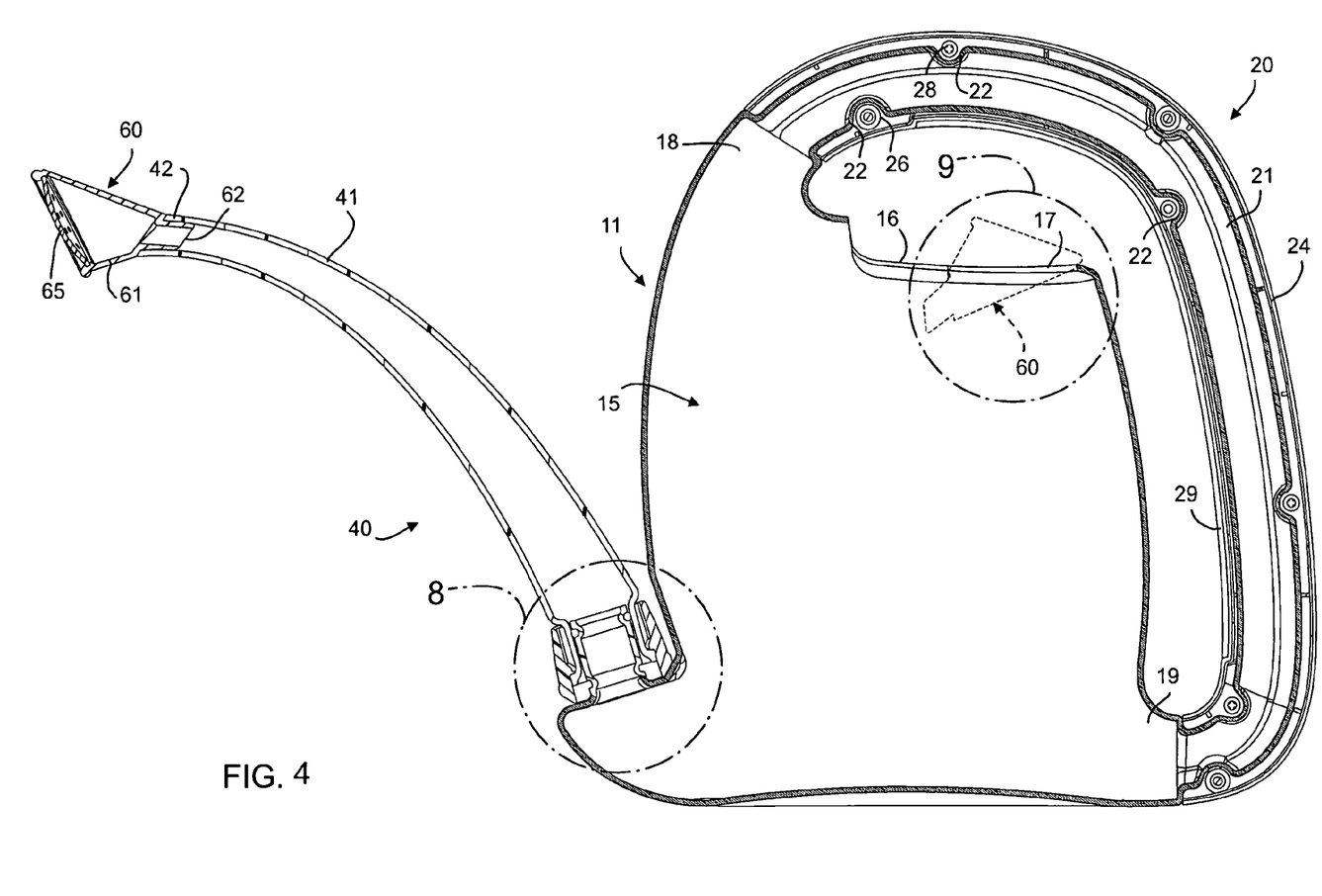
FIG. 4 is a reduced sectional view taken generally along the line 4—4 in FIG. 2, and illustrating a storage position for the spout nozzle.
Figure 9:
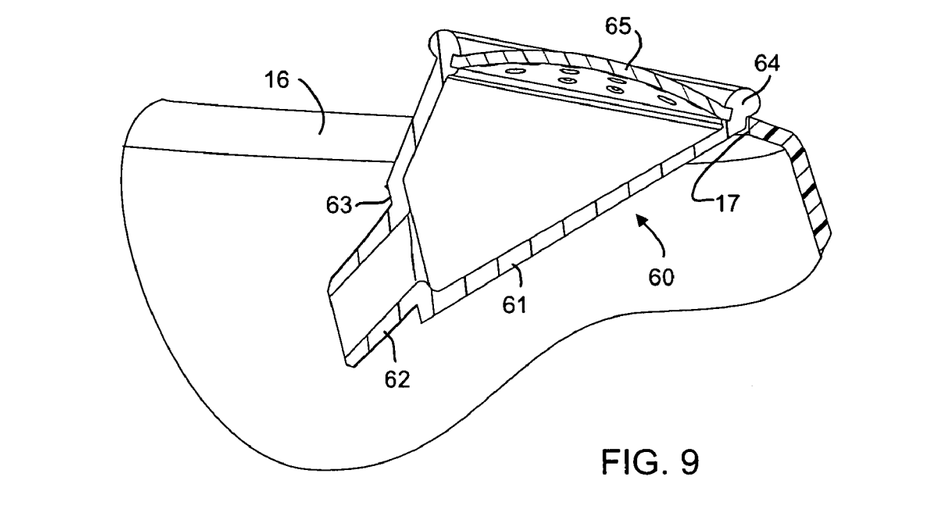
FIG. 9 is an enlarged, fragmentary view of the portion of FIG. 4 encircled and labeled "9"

The spout assembly 40 also includes a shower head 60, which has a generally frustoconical body 61 provided at its narrow end with a reduced-diameter neck 62 (FIGS. 4, 5 and 9) dimensioned to be press-fitted into the narrow discharge end 42 of the spout 41, the neck 62 defining an annular shoulder 63 at its upper end which seats against the end surface of the spout 41. The wide end of the body 61 has a rim 64 in which it is snap-fitted a circular spray plate 65 having a plurality of discharge apertures 66 formed therein. The shower head 60 is removable from the spout 41 and is dimensioned so that, when not in use, it may be snap-fitted into the rear cutout 17 of the fill opening 16, as is indicated in FIGS. 4 and 9, for storage.

Figure 1:
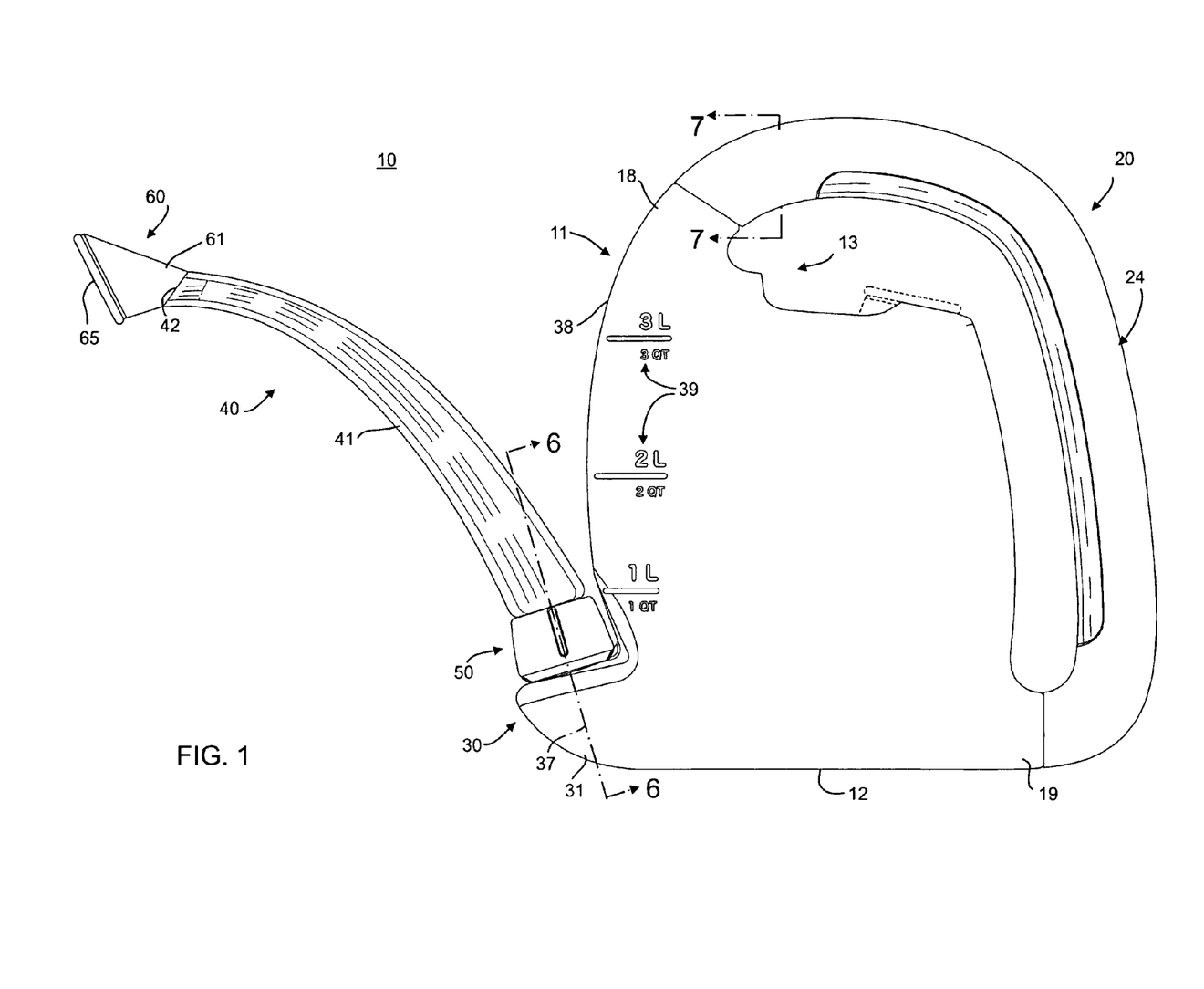
FIG. 1 is a side elevational view of a watering can with a spout disposed in a pouring position.
Figure 2:
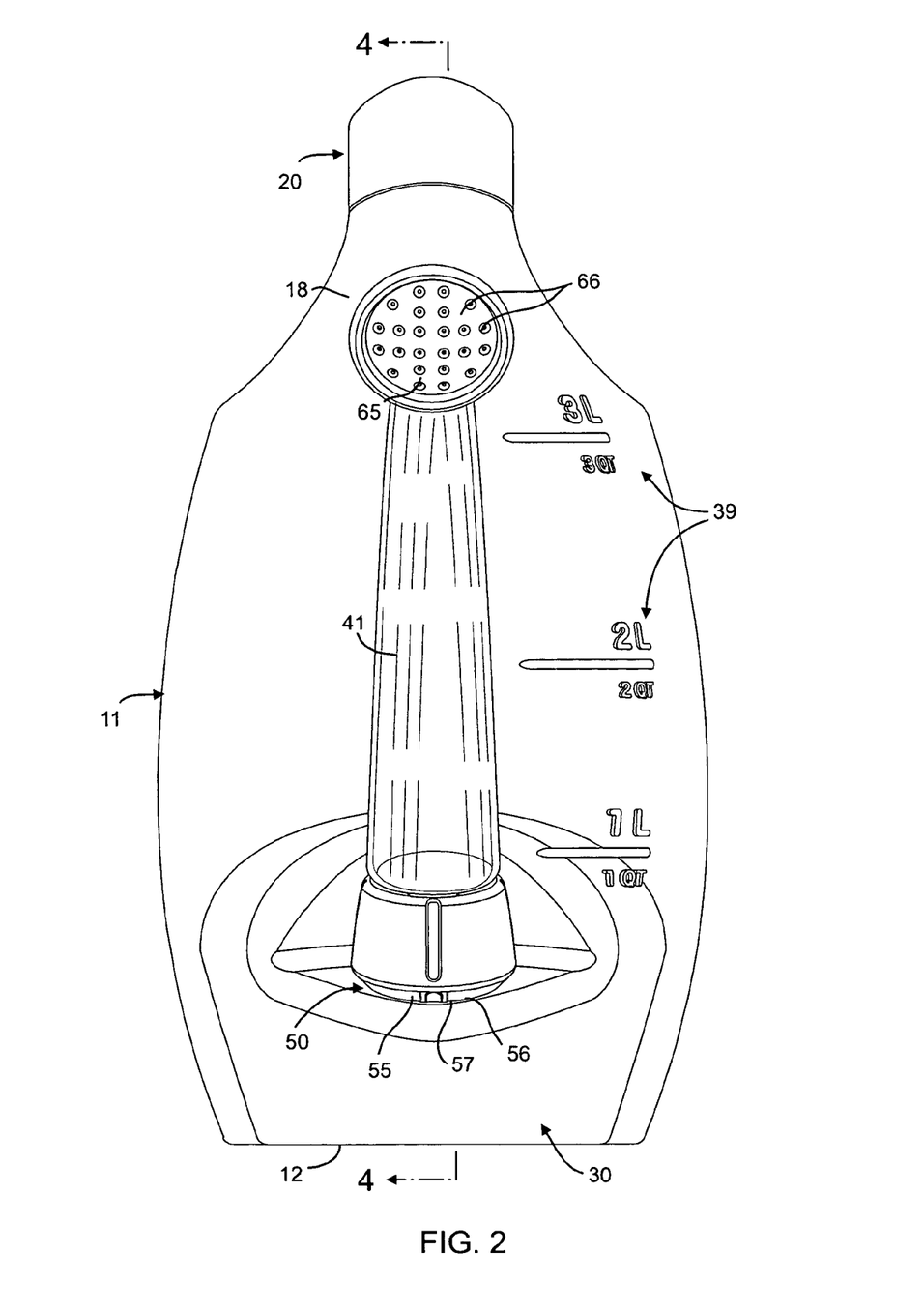
FIG. 2 is an enlarged, end elevational view of the watering can of FIG. 1, as viewed from the left-hand end thereof.
Figure 3:
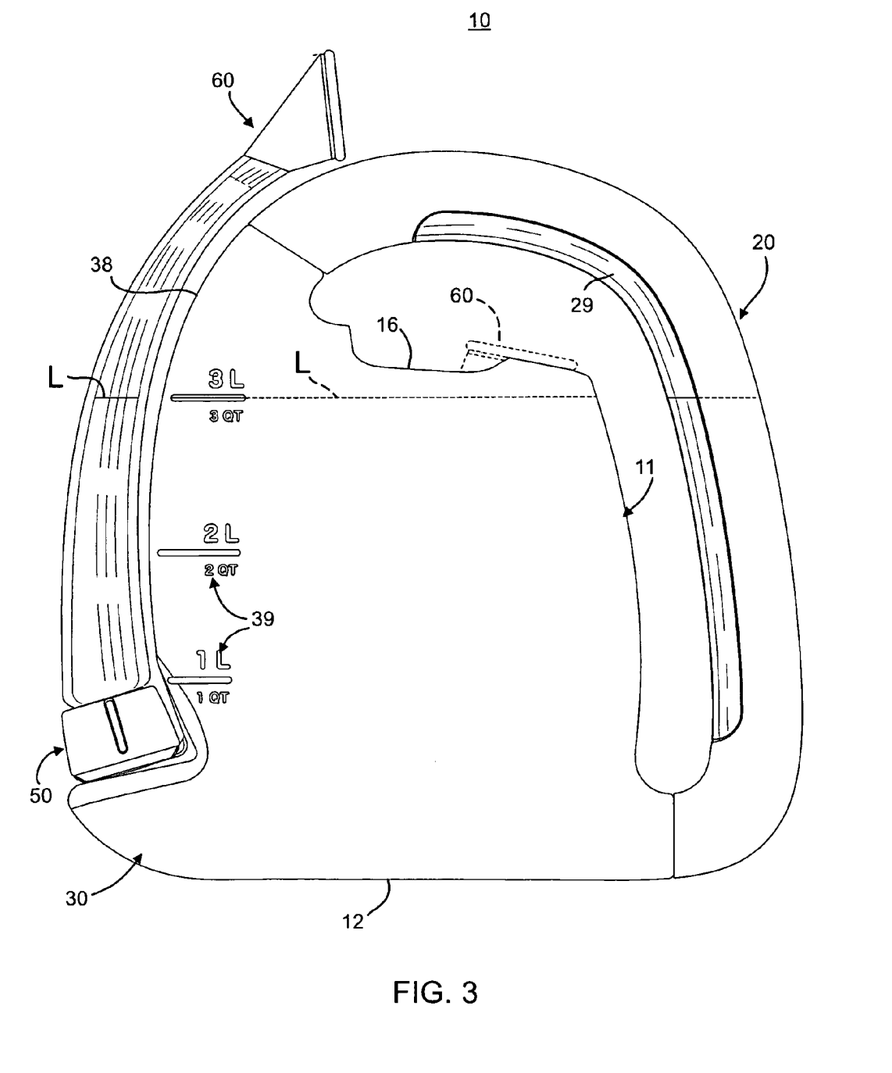
FIG. 3 is a view similar to FIG. 1, with the spout disposed in a storage position.

It is a significant aspect of the invention that, when the spout assembly 40 is mounted in place on the neck 32. as explained above, it can be swiveled through 360° about the axis 37 of the neck 32. In this regard, it will be appreciated that the spout 41 and collar 50 rotate together, the detent grooves 57 on the collar being snap-engageable with the detent bead 36 on the body front extension 30, respectively in pouring and storage positions, respectively illustrated in FIGS. 1 and 3, for example. In this regard, it will be noted that the spout 41 has a longitudinal curvature which generally matches the external contour 38 of the body 110 Thus, in the pouring position of FIG. 1, the spout 41 projects upwardly and outwardly away from the body 11 and, in the storage position FIG. 3, is disposed closely adjacent to the body 11, following the contour 38 thereof to provide a compact storage configuration which conserves storage space. To further lower the profile of the watering can 10 in its storage configuration, the shower head 60 may be removed and disposed in its stowed position in the cutout 17, as illusirated in phantom in FIG. 3.

The spout 41 may be formed of a light-transmitting material, either transparent or translucent, so that the fluid level "L" in the watering can 10 may be clearly visible therein. Because of the proximity of the spout 41 to the volume indicia 39 on the body 11, particularly in the storage position of the spout assembly, the visible fluid level in the spout can readily be correlated with the indicia 39 to determine the volume of fluid in the container, even though the body 11 of the container may be formed of an opaque material.

It can be seen that the handle assembly 20 has a generally horizontally extending upper portion, which can be grasped when carrying the watering can 10, and a generally upstanding rear portion which can be grasped when dispensing water from the watering can 10 and to facilitate tilting the can sufficiently to empty it. As was indicated above, the grip surface 31 of the front extension 30 provides an additional grasping point for lifting the watering can 10 overhead to facilitate watering elevated locations. The handle assembly 20 has an ergonomic non-circular transverse cross section which facilitates comfortable grasping, which is further facilitated by the elastomeric friction pads 29.

All of the parts of the watering can 10, with the exception of the O-ring 35, may be formed of suitable plastic materials. In this regard, the inner handle tube 21 of the handle assembly 20 could be formed unitary with the body 11. However, it will be appreciated that other materials, such as suitable metals could also be used, if desired, except for the light-transmitting spout 41.

From the foregoing, it can be seen that there has been provided an improved fluid container with a spout which can be easily swiveled between pouring and compact storage positions, can be light-transmitting to facilitate determination of the volume of contents in an opaque container, and has a comfortable, ergonomically designed handle assembly.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A fluid container comprising:

a body having a bottom and a top having a fill opening, and defining a storage compartment therein, an elongated spout carried by the body and in fluid communication with the storage compartment adjacent the bottom for pouring fluid therefrom, a swivel coupling between the spout and the body accommodating swiveling of the spout relative to the body, and an axis extending upwardly from the bottom of the body, relative to the top of the body and about which the spout is capable of swiveling.

2. The container of claim 1, wherein the spout is longitudinally arcuately curved.

3. The container of claim 2, wherein the spout is moveable between a pouring position extending away from the body and a storage condition disposed closely adjacent to the body and following an external contour thereof.

4. The container of claim 1, wherein the body includes a grip extension projecting therefrom adjacent to the bottom to facilitate a user's grasping of the container for lifting it overhead.

5. The container of claim 4, wherein the swivel coupling is disposed on the grip extension.

6. The container of claim 1, and further comprising a handle coupled to the top of the body at a front portion thereof adjacent to the spout and to the bottom at a rear portion thereof opposite the spout.

7. The container of claim 6, wherein the handle is non-circular in transverse cross section.

8. The container of claim 6, wherein the handle includes a flexible and resilient frictional gripping pad.

9. The container of claim 1, wherein the swivel coupling and the spout are configured to permit 360° rotation about the axis.

10. A fluid container comprising:

a body defining a storage compartment therein and having a top including a fill opening and a bottom, an elongated spout carried by the body and including a first end in fluid communication with the storage compartment adjacent to the bottom and a second end for pouring fluid from the spout the spout being formed of a light-transmitting material so that the level of fluid in the spout between the first and second ends is visible to a user, and volume indicia on the body adjacent to the spout so that the level of liquid in the spout between the first and second ends can easily be correlated with the indicia for indicating the volume of fluid in the storage compartment.

11. A fluid container comprising:

a body defining a storage compartment therein and having a top including a fill opening, a bottom and a predetermined external contour between the top and the bottom, an elongated spout carried by the body and in fluid communication with the storage compartment for pouring fluid therefrom, a swivel coupling between the spout and the body accommodating swiveling of the spout, and an axis about which the spout is capable of swiveling between a pouring position extending away from the body and a storage position, wherein the spout and the axis are configured such that in the storage position the spout is disposed closely adjacent to the body and follows the predetermined contour of the body from the bottom to the top.

12. The container of claim 11, wherein the swivel coupling is disposed adjacent to the bottom.

13. The container of claim 12, wherein the body has an outer convexly curved contour, the spout being longitudinally arcuately curved so that in the storage position it mateably nests alongside the body.

* * * * *